Aug. 24, 1926.

O. L. TUCKER 1,596,904

SPRING TIRE

Filed Sept. 29, 1923

WITNESSES

INVENTOR
OLLIE L. TUCKER

Patented Aug. 24, 1926.

1,596,904

UNITED STATES PATENT OFFICE.

OLLIE L. TUCKER, OF BERNICE, LOUISIANA.

SPRING TIRE.

Application filed September 29, 1923. Serial No. 665,685.

This invention relates to vehicle wheels, and has special reference to that type of wheels having inflated rubber tires.

More particularly, the invention relates to a shoe support for rubber tired wheels.

It is well known that the ordinary automobile tire is kept inflated by an inner tube blown up under air pressure. These tubes blow out, and are subject to puncture with the result that the tire collapses.

One very important object of the present invention is to provide an improved device for replacing the inner tubes of automobile tires and other like tires.

A second important object of the invention is to provide an improved metallic spring device for holding automobile wheel shoes or treads in inflated position.

With the above and other objects in view as will be hereinafter apparent, the invention consists in general of certain novel details of construction and combinations of parts hereinafter more fully described, illustrated in the accompanying drawings and specifically claimed.

In the accompanying drawings like characters of reference indicate like parts in the several views, and:

Figure 1:
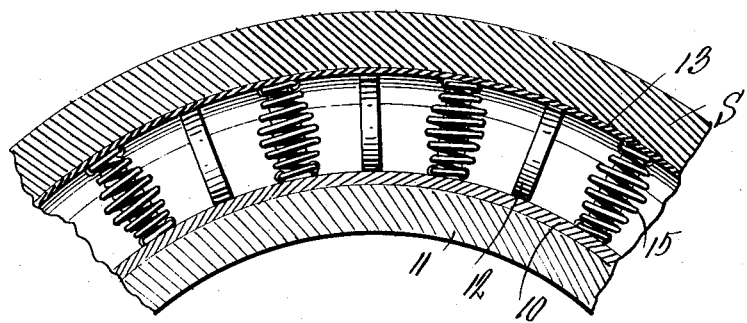
Figure 1 is a longitudinal section at right angles to the axis of the wheel and showing a portion of the wheel felly and the improved tire construction.
Figure 2:
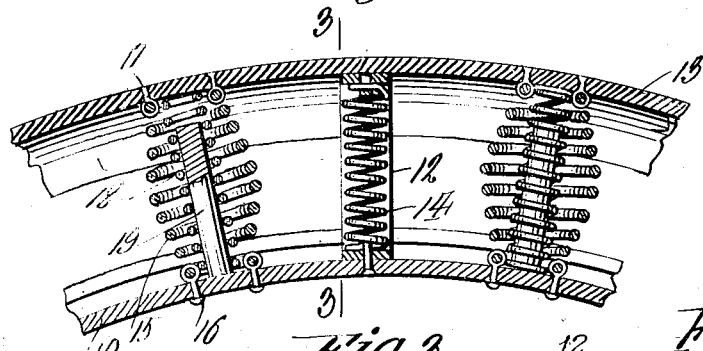
Figure 2 is an enlarged detailed view of certain of the parts shown in Fig. 1, the view disclosing certain springs in section.
Figure 3:
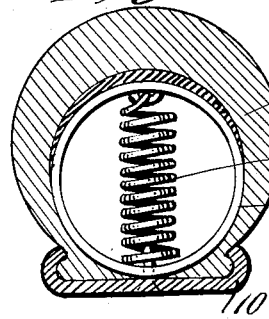
Figure 3 is a section on the line 3—3 of Fig. 2.

In the construction of this device, there is employed an ordinary wheel rim 10 adapted to fit on the wheel felly 11 in the usual manner. Secured at intervals along this wheel rim are annular bands 12 of spring metal. These bands are disposed transversely of the rim, and have their outer ends secured to an annular band 13 which is preferably of leather, and is lunate in cross section so that its edges merge smoothly into the peripheries of the bands 12. In order to strengthen the action of these bands against radial distortion, there is provided within each band a coiled compression spring 14, which is arranged diametrically of the band and radially with respect to the wheel rim.

Alternately with the bands 12 and springs 14 are other spring devices. Each of these consists of an outer barrel-shaped spring 15, which is secured to the rim 10 by rivets 16 and to the band 13 by rivets 17. Within this outer spring 15 is a second coiled compression spring 18, the ends of which rest respectively on the rim 10 and band 13. Extending axially through this last spring is a guide pin 19 which has its inner end secured to the rim by welding, and is spaced at its outer end from the strip 13.

It will now be seen that with this construction, the ordinary shoe S may be employed, which will fit over the rings 12 and band 13, and thus be held in the same position as though the usual inner tube was employed fully inflated. Furthermore, the yielding arrangement of the springs is such as to make the vehicle very easy riding when this device is employed.

There has thus been provided a simple and efficient device of the kind described and for the purpose specified.

Figure 4:
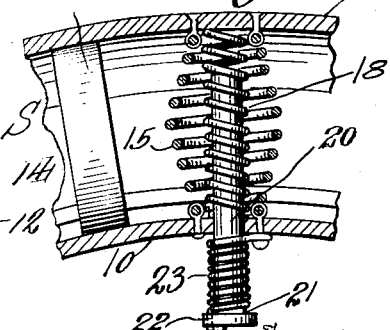
Figure 4 is an enlarged detail fragmentary section through the improved device showing a modified form thereof.

In Figure 4 is shown a slightly modified form of the invention, in which the rods or guide pins 20 are extended through the rim 10, as indicated by the reference character 21. The inner ends of the rods or guide pins 20 are provided with heads 22 and around the inner ends of the pins are coiled springs 23. The springs have the ends thereof adjacent to the rim 10 secured to the rim in any preferred way, while the opposite ends thereof are secured to the heads 22. It is obvious that when the tire is under compression that the rods or guide pins 20 will be pushed inwardly thus placing the springs 23 under tension, and these springs will normally tend to return the pins 20 to their normal position when pressure is relieved from the tire.

It is obvious that minor changes may be made in the form and construction of the invention without in any way departing from the material spirit thereof. It is not, therefore, desired to confine the invention to the exact form herein shown and described, but it is wished to include all such as properly come within the scope claimed.

Having thus described the invention, what is claimed as new, is:

1. The combination with the steel rim of a wheel; of spaced annular spring bands secured to the rim and arranged to project radially from the rim in transverse relation thereto, a flexible strip arcuate in cross section and supported on and secured to the outer portions of said bands, and coil springs connected to the rim and the strip and alternating with the annular bands, said coil springs being arranged radially with respect to the rim.

2. The combination with the rim of a wheel, of spaced annular spring bands secured to the rim and arranged to project radially from the rim in transverse relation thereto, a flexible strip arcuate in cross section and supported on and secured to the outer portions of said bands, outer coil springs connected to the rim and strip and alternating with the bands, said coil springs being arranged radially with respect to the rim, a guide pin for each of the coil springs slidably extending through the rim, smaller springs arranged within the outer springs and coiled about the inner ends of the pins and having their opposite ends resting respectively against the rim and against the strip and means for returning the guide pins to their normal position after being pushed inwardly.

In testimony whereof I affix my signature.

OLLIE L. TUCKER.